United States Patent
Horner

[15] 3,706,794
[45] Dec. 19, 1972

[54] PRODUCTION OF SULPHONYL CHLORIDES

[72] Inventor: Patrick James Horner, Welwyn Garden City, England

[73] Assignee: Imperial Chemical Industries Limited, London, England

[22] Filed: Feb. 16, 1967

[21] Appl. No.: 616,467

[30] Foreign Application Priority Data

Feb. 28, 1966 Great Britain.......................8,719/66

[52] U.S. Cl...............260/543 R, 260/49, 260/332.5, 260/346.2 M
[51] Int. Cl............................................C07c 143/70
[58] Field of Search............260/543 R, 544 L, 544 R

[56] References Cited

UNITED STATES PATENTS

| 2,888,486 | 5/1959 | Gregory | 260/543 |
|---|---|---|---|
| 3,184,506 | 5/1965 | Parker et al. | 260/544 |

FOREIGN PATENTS OR APPLICATIONS

| 581,615 | 8/1959 | Canada | 260/543 |
|---|---|---|---|
| 553,871 | 1/1957 | Belgium | 260/543 |

OTHER PUBLICATIONS

Methoden Der Organischen Chemie, Houben–X Weyl Volume 9 pp. 564–65, (1955)

Primary Examiner—Lorraine A. Weinberger
Assistant Examiner—Robert Gerstl
Attorney—Cushman, Darby & Cushman

[57] ABSTRACT

A sulphonyl chloride is produced from the corresponding free sulphonic acid using a catalytic amount of a chlorinated tertiary organic amide and excess chlorinating agent by introducing the sulphonic acid no faster than it is used up.

5 Claims, No Drawings

PRODUCTION OF SULPHONYL CHLORIDES

This invention relates to the production of sulphonyl chlorides from sulphonic acids using a chlorinating agent in the presence of a tertiary organic amide.

Tertiary organic amides can function catalytically in chlorination reactions and this is believed to occur via a chlorinated complex formed between the amide and the added chlorinating agent. In the case of N,N-dimethylformamide and phosgene, for example, a fairly stable complex of the formula $[(CH_3)_2N{:}CHCl]^+.Cl^-$ seems to be formed with elimination of carbon dioxide, probably via $[(CH_3)_2N{:}CH.OCO.Cl]^+.Cl^-$ which is much less stable. This complex will then replace a hydroxy group on a substrate by a chlorine atom, with regeneration of N,N-dimethylformamide and evolution of hydrogen chloride.

Carboxylic acids, and alkali metal salts of organic sulphonic acids, have been chlorinated in this way to give the respective acid chlorides using small quantities of N,N-dimethylformamide. Sulphonic acids, however, have been chlorinated in the presence of N,N-dimethylformamide only when the latter was used in excess (as a solvent). When the chlorinating agent is introduced into a system containing a sulphonic acid and only a catalytic amount of N,N-dimethylformamide, little or no sulphonyl chloride is produced.

According to the invention, a sulphonyl chloride can be produced from the corresponding free sulphonic acid in a reaction mixture containing a catalytic amount of a chlorinated complex of a tertiary organic amide by having chlorinating agent present in the reaction mixture throughout the reaction and introducing the sulphonic acid (after a small initial addition) at a rate no greater than the rate at which the sulphonic acid is used up. This rate can be measured by a variety of methods including monitoring the emission of hydrogen chloride or of carbon dioxide during the reaction; the sulphonic acid is then introduced accordingly. If the sulphonic acid is added initially at too fast a rate, no hydrogen chloride or carbon dioxide is evolved other than the hydrogen chloride already evolved bound in the chlorinated tertiary amide. By means of such simple experimentation, the initial additions appropriate to particular amounts of catalyst and conditions of reaction can readily be determined. If at any time during the reaction the rate of adding the sulphonic acid becomes too great, hydrogen chloride and carbon dioxide are then no longer evolved.

A solvent for the reaction is not essential but is usually convenient. The solvent (or the components of a solvent mixture) should be free from active hydrogen atoms and unreactive with the chlorinating complex.

The temperature of the reaction can be any temperature below the decomposition point of the chlorinating complex and at which the reaction mixture is liquid.

It may sometimes be possible to increase the rate of adding the sulphonic acid as the reaction proceeds, particularly when the chlorinated tertiary organic amide is initially only partly soluble in the reaction mixture and dissolves as the reaction proceeds.

The tertiary organic amide can generally be a compound of the formula $R^1.CX.NR^2R^3$, in which X is oxygen or sulphur (preferably oxygen), $R^1$ is hydrogen, alkyl, cycloalkyl, aralkyl, lower alkoxy or di(lower alklyl)amino ("lower" means containing up to four carbon atoms) or is $NR^2R^3$, $R^2$ and $R^3$ are alkyl, aralkyl, or aryl, and $R^1$, $R^2$ and $R^3$ may represent in pairs common members of a heterocyclic ring containing the amide nitrogen atom. In particular, an N-formyl secondary amine (other than an N-formyl diaryl amine), for example N,N-dimethylformamide, N-methylformanilide, N-formylpiperidine or N-formylmorpholine, can be used. N,N-Dimethylformamide is usually the most convenient. Apart from incidental losses, the tertiary amide is not consumed but remains to catalyse further chlorination. It may however be removed from the reaction mixture together with the product if the process is operated in a continuous manner and must then be replaced continuously. Although the chlorinated complex can be introduced as such, it is usually more convenient to add the tertiary amide itself and allow the complex to be formed in situ in the reaction vessel.

The chlorinating agent may be a non-metallic chloride, especially a carbonyl chloride (e.g. phosgene or oxalyl chloride) or a chloride of phosphorus or sulphur such as phosphorus pentachloride or thionyl chloride.

It is often convenient to introduce the sulphonic acid by adding it as such. In certain circumstances, however, it may instead be generated in situ at a rate controlled by that of adding a suitable precursor to the reaction mixture, i.e. a reagent that reacts with a component already present in the reaction mixture to give the sulphonic acid.

The sulphonyl chloride produced is isolated in conventional manner. For a molecule containing only one sulphonyl chloride group, this conveniently involves distillation, but where the molecule contains more than one sulphonyl chloride group the products are not readily distilled and instead may be crystallized.

The method of the invention is especially useful for the production of sulphonyl chlorides in which each —$SO_2Cl$ group is bound to a homocyclic or heterocyclic ring of aromatic character. For example the —$SO_2Cl$ group may be linked to a benzene ring (free as in benzene, biphenyl and diphenyl ether, or conjugated with other rings as in naphthalene and dibenzofuran), or to a heterocyclic ring as in thiophene. The method particularly applies to the chlorination of sulphonic acids in which each sulphonic acid group is para or ortho to an electron-donating group such as ether or sulphide. Substituents other than sulphonic acid groups may be present, but those that react with the chlorinating system (for example groups containing active hydrogen atoms) should be absent unless the group resulting from such reaction is permissible in the sulphonyl chloride produced.

The sulphonyl chlorides produced from 4-phenoxybenzene-sulphonic acid and biphenyl-4-sulphonic acid, when heated in the presence of a Lewis acid capable of generating sulphonylium cationic species therefrom, undergo polycondensation with the elimination of hydrogen chloride to produce aromatic polysulphones, formed of repeating units having the structure —$C_6H_4$–O–$C_6H_4$–$SO_2$— and optionally also units of the structure –$C_6H_4$–$C_6H_4$–$SO_2$—, as described in British specification Nos. 1,016,245 and 1,060,546 and French specification Nos. 1,383,048 and 1,453,031. These polymers are thermoplastics with very high softening points (over 200°C) and great resistance to acids and alkalis even at temperatures approaching their softening points.

The following examples illustrate the invention.

EXAMPLE 1

A reaction vessel (capacity 1 dm$^3$), equipped with a stirrer, a gas inlet, a thermometer, a condenser cooled with solid carbon dioxide and acetone, and a metering pump for introducing dropwise liquid starting materials, was set up in a vapor jacket heated by methanol. N,N-Dimethylformamide (10 cm$^3$) was put into the reaction vessel and a stream of nitrogen was passed through. The exit gas stream could be titrated for hydrogen chloride and carbon dioxide. The vapor from liquid phosgene (10 cm$^3$) brought to its boiling point was swept into the reaction vessel in the nitrogen stream. After a few minutes a solid chlorinated complex had formed. With the stirrer going, and the stream of nitrogen continued, a liquid mixture of 4-phenoxybenzenesulphonic acid (51 parts by weight) and carbon tetrachloride (49 parts by weight) was then slowly introduced into the reaction vessel at such a rate that 1 mole of the sulphonic acid was added in 4 hours. Phosgene vapor (from 90 cm$^3$ of liquid) was added via the nitrogen stream so as to be in excess throughout, and the reaction temperature was maintained at 55° to 60°C. The product was then stirred for 1 hour further, and phosgene was removed. The product distilled at 0.3 torr at 140° to 166°C to yield a pale yellow liquid (207 g; 77 percent yield) which solidified on standing and was shown by infra-red analysis to be 4-phenoxybenzenesulphonyl chloride. When recrystallized from petroleum (boiling range 40° to 60°C) it gave large colorless crystals, m.p. 44° to 45°C.

The reaction was also carried out with similar success at 15°C.

EXAMPLE 2

The reaction vessels were set up under a stream of nitrogen as described in Example 1.

In one vessel, N,N-dimethylformamide (10 cm$^3$) and phosgene (10 cm$^3$) reacted to give a solid complex, and pure 4-phenoxybenzene-sulphonic acid (1 mole) was then introduced over 4 hours while the mixture was saturated with phosgene and maintained at 55° to 60°C. One hour later, phosgene was removed and the product distilled to give 4-phenoxybenzenesulphonyl chloride in 60 percent yield. When the sulphonic acid (1 mole) was added more quickly, over 3 hours instead of over 4 hours, the sulphonyl chloride was formed in yields of 40 to 60 percent, while on adding the sulphonic acid (1 mole) over 100 minutes no sulphonyl chloride was obtained.

In the other vessel, 4-phenoxybenzenesulphonic acid (1 mole, containing about 3 percent of carbon tetrachloride) was mixed with N,N-dimethylformamide and phosgene was introduced and maintained in excess for 7 hours while the reaction mixture was maintained at 55° to 60°C. Phosgene was then removed and distillation of the product was attempted, but no 4-phenoxybenzenesulphonyl chloride was obtained.

EXAMPLE 3

A solution of biphenyl-4-sulphonic acid (0.24 mole) in sym-tetrachloroethane (530 cm$^3$) was added slowly to a mixture of phosgene (1 mole) and N,N-dimethylformamide (10 cm$^3$) at about 10°C over a period of 2 hours in a reaction vessel similar to that used in Example 1, while the solution was stirred and nitrogen was passed through it to remove the hydrogen chloride that was formed. This was continued for 1 hour after the addition was complete, and the excess phosgene was then removed. The resulting solution was washed three times with water. The solvent was then removed and the product was distilled at 144°C at 0.3 torr to 152°C at 0.4 torr. Biphenyl-4-sulphonyl chloride (55 g, identified by infra-red analysis) was obtained as a white solid in 90 percent yield. The residue also contained some biphenyl-4-sulphonyl chloride, detectable on infra-red examination.

EXAMPLE 4

Liquid phosgene (100 cm$^3$; 1.4 moles) was vaporized and added, slowly at first, over 30 minutes to a mixture of N,N-dimethylformamide (50 cm$^3$; 0.65 mole) and methylene chloride (50 cm$^3$) in a water-jacketed reaction vessel (capacity 2 dm$^3$) equipped with a stirrer, a gas inlet, a thermometer, a reflux condenser cooled with solid carbon dioxide and acetone, and a metering pump for introducing liquids. A solid separated out of the solution in the vessel. A solution (total volume 1.61 dm$^3$) of 4-phenoxybenzene-sulphonic acid (1.05 kg; 4.5 moles) was introduced at a controlled rate not appreciably exceeding 1 mole/hour, as described in the table below. After 30 minutes, the solid in the vessel had dissolved. Throughout the addition of the sulphonic acid, phosgene was introduced so as to be in an excess over the sulphonic acid of at least 0.5 mole. The reaction was followed by measuring hydrogen chloride in the effluent gas from the reaction vessel, and when it was complete the mixture was stirred for 1 hour further and excess phosgene was removed. The solution was then washed three times with water (1 dm$^3$), and the solvent was removed in a rotary evaporator to give 4-phenoxybenzenesulphonyl chloride (1.325 kg).

The following table shows the progress of the reaction, the amounts given being the totals in moles for each substance at the time indicated.

| Time h min | 4-Phenoxybenzene-sulphonic acid | Phosgene | Hydrogen chloride | Temp. 20°C |
|---|---|---|---|---|
| 0 0 | 0.14 | 1.41 | 0.02 | 20 |
| 0 15 | 0.31 | 1.48 | 0.03 | 15 |
| 0 30 | 0.49 | 1.48 | 0.05 | 16 |
| 0 45 | 0.74 | 1.90 | 0.11 | 18 |
| 1 0 | 1.01 | 2.25 | 0.25 | 18 |
| 1 15 | 1.26 | 2.96 | 0.58 | 18 |
| 1 30 | 1.51 | 2.96 | 0.88 | 18 |
| 1 45 | 1.71 | 3.38 | 1.12 | 17 |
| 2 0 | 1.96 | 3.66 | 1.38 | 18 |
| 2 15 | 2.21 | 3.80 | 1.68 | 19 |
| 2 30 | 2.45 | 4.08 | 1.91 | 20 |
| 2 45 | 2.68 | 4.15 | 2.25 | 20 |
| 3 0 | 2.96 | 4.29 | 2.54 | 19 |
| 3 15 | 3.19 | 4.36 | 2.79 | 19 |
| 3 30 | 3.38 | 4.36 | 3.03 | 19 |
| 4 0 | 3.90 | 4.79 | 3.63 | 19 |
| 4 15 | 4.14 | 5.91 | 4.16 | 23 |
| 4 30 | 4.39 | 5.91 | 4.38 | 19 |
| 4 40 | 4.50 | 5.91 | 4.46 | 19 |

An aliquot of this product was purified in an Edwards 2-inch wiped-wall molecular still, and the distilled 4-phenoxybenzenesulphonyl chloride (13.44 g) was dissolved in dry nitrobenzene (15 cm³) and polymerized at 120°C over 3 hours after the addition of a 1.1% v/v solution (5 cm³) of antimony pentachloride in nitrobenzene. The viscous solution obtained was poured into stirred methanol and the precipitated polymer was washed three times with hot methanol, then boiled in a mixture of acetone and methanol, and dried for 16 hours at 180°C under high vacuum. The polymer had repeating units of the structure

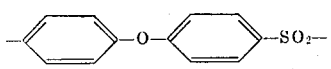

Its reduced viscosity was 1.4 (measured on a solution of 1 gram of the polymer in 100 cm³ of N,N-dimethylformamide at 25°C), and when pressed into a film at 320°C it gave a tough transparent pale yellow sheet.

EXAMPLE 5

N,N-Dimethylformamide (5 cm³; 0.065 mole) was added slowly to phosphorus pentachloride (104 g; 0.5 mole $PCl_5$) and methylene dichloride in a reaction vessel similar to that used in Example 1, but with a reflux condenser cooled with water instead of solid carbon dioxide and acetone (this simplification being due to the absence of phosgene in the vessel). With stirring and passage of a stream of nitrogen through the vessel, a solution (150 cm³) containing 4-phenoxybenzenesulphonic acid (121 g; 0.45 mole) in methylene chloride having a total acid equivalent of 0.5 mole was added at a controlled rate as shown in the following table, while the reaction was followed by measuring the hydrogen chloride in the effluent gas. In the table, the amounts are the aggregates in moles for the acid solution added and the hydrogen chloride evolved at the time indicated.

| Time | Acid added | HCl evolved | Temp. |
| --- | --- | --- | --- |
| 0 min | 0 | 0 | 28°C |
| 15 | 0.13 | 0.09 | 16 |
| 30 | 0.23 | 0.17 | 16 |
| 45 | 0.50 | 0.31 | 16 |
| 47 | 0.50 | 0.34 | 16 |
| 75 | 0.50 | 0.42 | 16 |
| 95 | 0.50 | 0.44 | 16 |
| 120 | 0.50 | 0.45 | 16 |

The acid solution was added over a period of 45 minutes, at the end of which the solid phosphorus pentachloride in the vessel had almost completely dissolved. After another 30 minutes, the evolution of hydrogen chloride was substantially complete and there was no solid (only a clear colorless solution) in the vessel. Stirring under nitrogen at 16°C was continued for a further 145 minutes. Methylene chloride was then removed from the solution in a rotary evaporator at 40°C under a water pump for 20 minutes, and then most of the phosphoryl chloride (formed from phosphorus pentachloride) was removed in the same apparatus at the same temperature at 1–10 torr for 35 minutes. The residue was diluted with methylene chloride (100 cm³), washed three times with water (100 cm³) and evaporated in the rotary evaporator at 40°C under a water pump to give 4-phenoxybenzenesulphonyl chloride (identified by infra-red analysis) as a white solid in 85 percent yield.

I claim:

1. A method for the production of a sulphonyl chloride from the corresponding free sulphonic acid in a reaction mixture containing no more than a catalytic amount of a chlorinated tertiary organic amide, in which phosgene is present in the reaction mixture throughout the reaction and the sulphonic acid is introduced, after a small initial addition, at a rate no greater than the rate at which the sulphonic acid is used up.

2. A method according to claim 1, in which the sulphonyl chloride produced is 4-phenoxybenzenesulphonyl chloride.

3. A method according to Claim 1, in which the sulphonyl chloride produced in biphenyl-4-sulphonyl chloride.

4. A method according to claim 1, in which the reaction mixture contains an unreactive solvent.

5. A method according to claim 1, in which the tertiary organic amide is N,N-dimethylformamide.

* * * * *